W. H. BAYNARD.
SHOE AND METHOD OF MAKING THE SAME.
APPLICATION FILED NOV. 13, 1915. RENEWED AUG. 27, 1917.
1,274,665.
Patented Aug. 6, 1918.
2 SHEETS—SHEET 1.
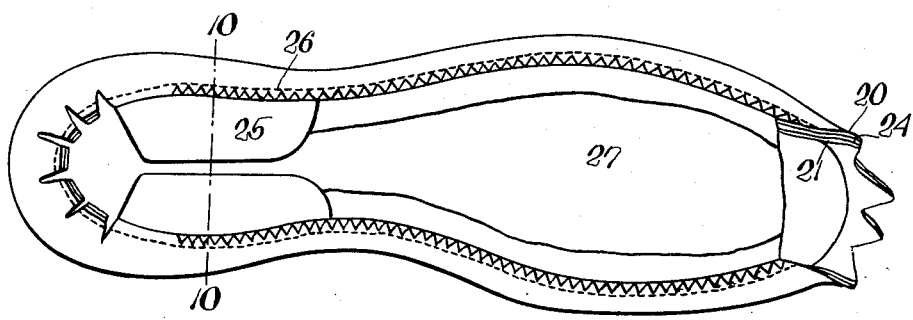
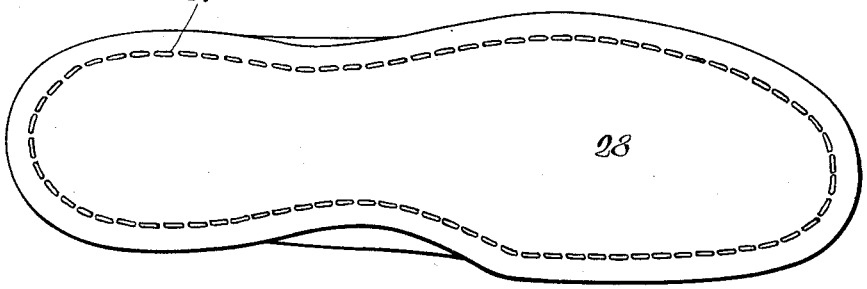
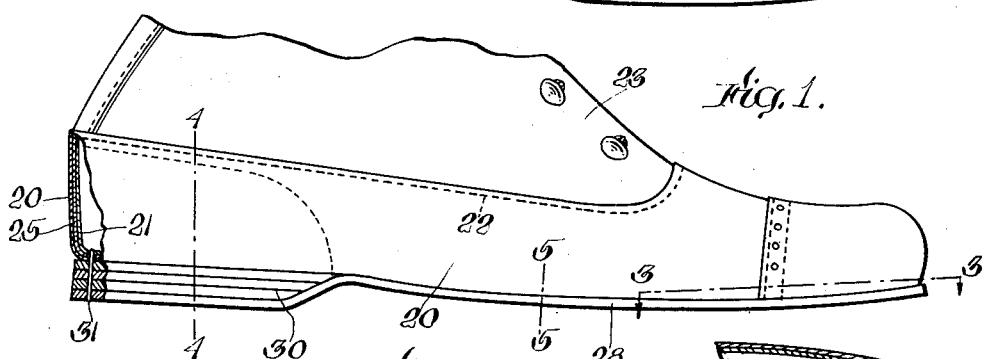
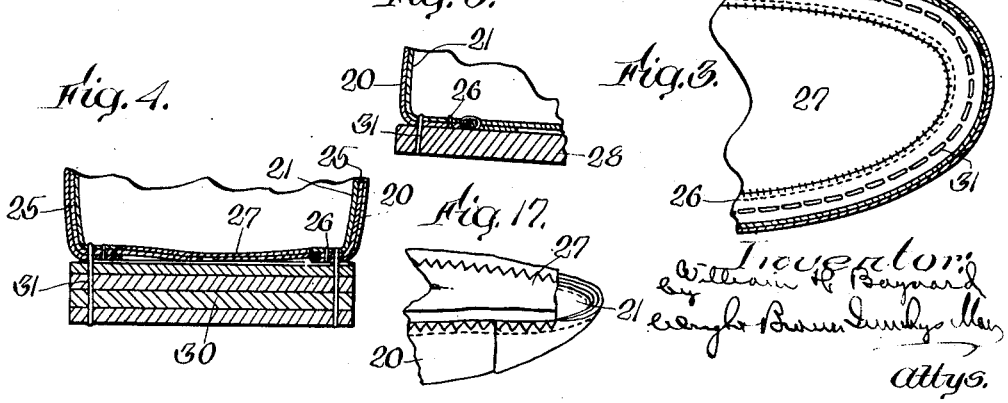

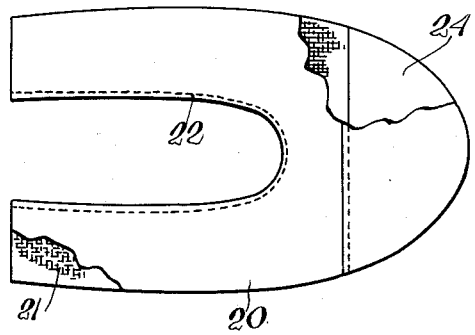
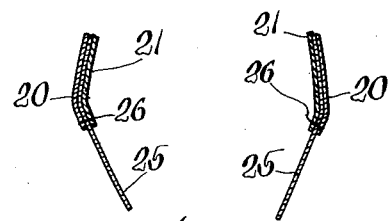
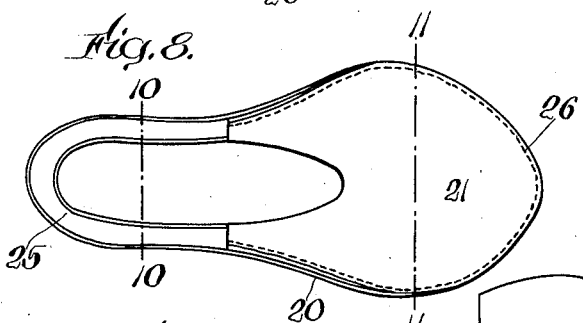
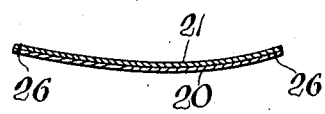
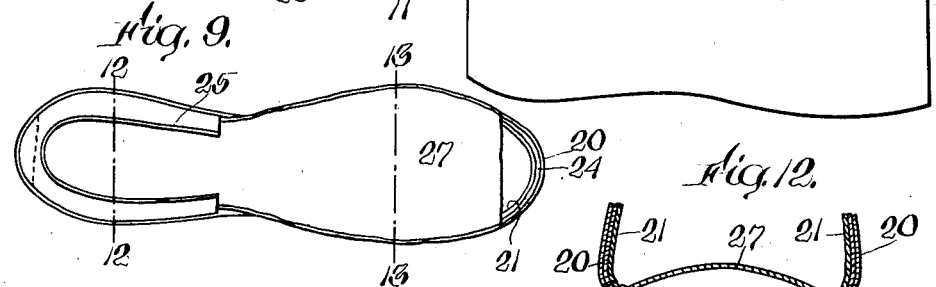
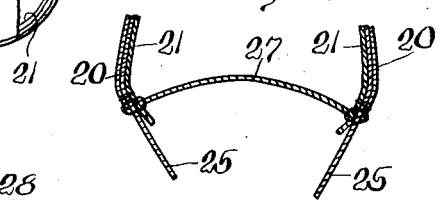
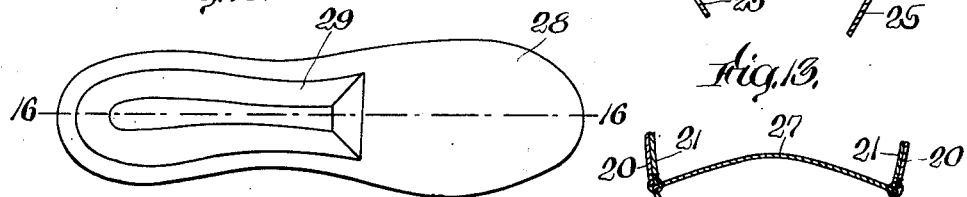
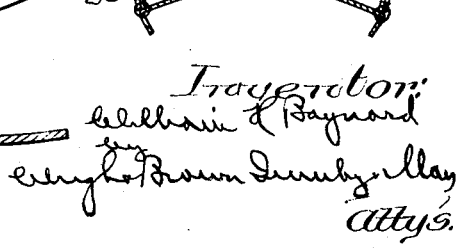
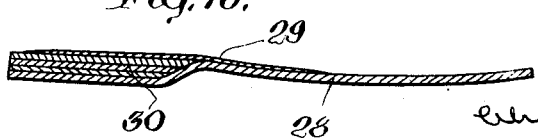

UNITED STATES PATENT OFFICE.

WILLIAM H. BAYNARD, OF BRAINTREE, MASSACHUSETTS.

SHOE AND METHOD OF MAKING THE SAME.

1,274,665.      Specification of Letters Patent.      Patented Aug. 6, 1918.

Application filed November 13, 1915, Serial No. 61,254. Renewed August 27, 1917. Serial No. 188,490.

*To all whom it may concern:*

Be it known that I, WILLIAM H. BAYNARD, a citizen of the United States, residing at Braintree, in the county of Norfolk and State of Massachusetts, have invented certain new and useful Improvements in Shoes and Methods of Making the Same, of which the following is a specification.

The object of this invention is to provide an improved shoe and a new method of making the same. Ordinarily in actual practice in the manufacture of both McKay and Goodyear welt shoes, an innersole is first positioned upon the last, the vamp is placed on the last, and the vamp is then stretched about the last and secured to the innersole. The innersole must be preferably prepared for use, and its edge defines the contour of the lower edge of the vamp, and, where it is made of leather or leather and canvas, it materially increases the stiffness of the shoe.

The present invention has for its object to provide a shoe in which there is no innersole, as a result of which I obviate the crease which is ordinarily formed between the feather edge of the innersole and the upper, and which frequently forms a source of much discomfort to the wearer, and also materially reduce the expenses in production, not only in the cost of the materials used in the shoe but also in the machines and labor necessary for its manufacture.

In producing the shoe, I employ an attaching member, which, for lack of a better term, I call the sole lining, and which is initially shaped generally to follow the contour of the lower edge of the finished shoe except at the extremities thereof. The lower edge of the vamp is attached to the margin of the sole lining, after which a last is inserted in the thus partially formed shoe. The edge of the vamp extends a short distance across the sole of the last, and, when the outer sole is temporarily secured in place, the last is withdrawn and fastenings are passed through the sole and the edge of the vamp along a line outside of the edge of the sole lining, as a result of which the vamp is secured directly to the sole, and the contour of the lower part of the vamp is defined by the line of fastenings.

There is an advantage incident to the employment of a flexible sole lining, since it facilitates the attachment thereof to the edge of the vamp. Consequently I preferably employ a textile material for the purpose, and usually one which will not stretch materially. The sole lining is cut to size and shape, since it determines the size of the shoe, and then, being creased or bent on a longitudinal line to make the operation easier, is stitched by a straight-needle sewing machine to the upper. Since the vamp is usually provided with a vamp lining, I prefer to stitch the lower edges of the same together, before which, however, I insert between them a counter stiffener and a toe stiffener, so that the line of stitches secures said stiffeners in place. The counter stiffener and toe stiffener are preferably made of a fibrous material impregnated with a stiffening compound which may be rendered soft and flexible, and which will set or harden after being molded to fit the end of the last.

Hence, having assembled the vamp and its lining and the end stiffeners, and having attached the vamp to the sole lining, a last is inserted in the partially formed shoe, after which the end stiffeners are softened, and, by means of a suitable end-wiping or end-lasting machine, the edges at the ends of the shoe are wiped in over the sole lining and are held until the stiffening material hardens and sets. This last operation molds the counter stiffener and toe box to the corresponding ends of the last. The outer sole is then temporarily secured in place, preferably by cementing it to the bottom of the partially completed shoe and pressing it thereagainst by a sole-laying machine, after which the last is withdrawn and said sole is secured permanently by fastenings passed through the edge of the vamp and its lining, and through the sole. Ordinarily, for the final stitching operation, I employ a McKay sewing machine, and the line of stitches formed thereby, which parallel but are located outside the seam uniting the sole lining and the vamp, define the conformation of the upper at its junction with the outer sole.

On the accompanying drawings,—

Figure 1 represents a spring-heel shoe made according to my method and embodying my invention.

Fig. 2 represents a bottom view of the same.

Fig. 3 represents a section on the line 3—3 of Fig. 1.

Fig. 4 represents a transverse section on the line 4—4 of Fig. 1.

Fig. 5 represents a section on the line 5—5 of Fig. 1.

Fig. 6 shows the partially formed shoe before the sole is attached thereto. In this figure, the heel end has been slit and wiped over.

Fig. 7 shows a blank for the vamp and its lining.

Fig. 8 illustrates the next step in the formation of the shoe in which the counter and the toe box are inserted in place and secured to the vamp.

Fig. 9 illustrates the next step in which the sole lining it stitched to the vamp.

Fig. 10 represents a section on the line 10—10 of Fig. 8.

Fig. 11 represents a section on the line 11—11 of Fig. 8.

Figs. 12 and 13 represent respectively sections on the lines 12—12 and 13—13 of Fig. 9.

Fig. 14 represents the sole lining blank.

Fig. 15 illustrates the sole with the shank stiffener secured thereto.

Fig. 16 represents a section on the line 16—16 of Fig. 15.

Fig. 17 shows how the sole lining is stitched to the upper.

In carrying out my method of manufacturing shoes, I first, by means of suitable patterns, form the vamp and its lining as shown in Fig. 7, the vamp being indicated at 20 and the lining at 21. By means of a row of stitches 22, the upper edge of the lining 21 is stitched to the vamp, this occurring at the same time that the remainder of the upper 23 is attached to the vamp if desired. The rear or heel ends of the vamp and the lining therefor are next united in the usual way. Then in the toe end, between the lining and the vamp, there is inserted a toe box blank as indicated at 24, and there is at the same time inserted at the heel end a partially molded counter 25. I preferably employ a counter of such dimensions that its lower edges may be folded over the last and practically meet, as shown in Fig. 6, to form a heel seat, although in some instances this is not essential. After these parts have been thus assembled, the lower edges of the vamp and the lining of the toe box are preferably connected by a line of stitches 26 which parallel or closely follow the edge of the vamp. These stitches pass through the counter at some distance from the lower edge thereof and through the toe box and hold them in place. The sole lining, which is indicated at 27 in Fig. 14 and which has been cut to the proper shape and size, is then united to the edge of the upper and to the box and the counter. For this purpose, I preferably employ a sewing machine which forms an over-edge stitch. The limpness and flexibility of the sole lining permits this to be easily accomplished, since it can be folded along its median line so that it will lie flat against the vamp and the vamp lining, as shown in Fig. 17. Preferably the sole lining is truncated at its ends so that it is not equal in length to the finished shoe. I should not regard it as a departure from my invention if some material other than the limp flexible material herein described were used in lieu thereof. The sole lining determines the size of the shoe, and it should be as wide as possible in order to reduce the area of the expensive vamp material and yet allow for the inturned edge of the vamp to which the sole is directly secured.

In Fig. 8, I have illustrated the vamp and the parts which are secured thereto prior to the attachment of the sole lining, and, in Fig. 9, I have shown the shoe with the sole lining secured thereto. It will be noticed that the edge of the sole lining protrudes beyond the edge of the vamp and that it lies under the flaps or edges of the counter. When the shoe has been brought to this state of completion, a last of the proper size and shape is then inserted into it so as to give it the proper shape and to stretch it to the desired extent.

In Fig. 6, the bottom of the shoe is shown with the last thereinto inserted, and it will be seen that the edges of the vamp and vamp lining are inturned over the bottom or sole of the last. Then, by any suitable instrumentality, the toe and heel ends of the vamp are slit. The ends of the shoe are sufficiently heated by any suitable means or otherwise treated to soften the stiffening compound in the box and the counter, and then, by means of a suitable machine such as a bed-laster, the ends of the shoe are wiped over and are held in place until the stiffening compound sets and hardens. More or less of the adhesive stiffening compound oozes from the fibrous base of the box or the counter and cements the wiped-over portions of the vamp and the lining therefor together and holds them tightly down on the sole of the last. In Fig. 6, the heel end of the partially completed shoe has been wiped over and the toe end is ready to be so wiped. The sole, as indicated at 28, is cut into the proper shape and form, and upon its upper surface, if desired, there is cemented a shank stiffener 29, as indicated in the last-mentioned figure.

In the drawings, I have shown, as exemplifying my process, a spring-heel shoe, and hence in Fig. 16 it will be noticed that with the sole there is formed the spring-heel 30, but the invention may be practised in connection with or embodied in other forms of shoes. The upper surface of the sole or the bottom of the shoe or both are then coated with cement, the sole is placed upon the bottom of the shoe and is firmly pressed thereagainst by any suitable form of machine having a die of the proper shape until the sole is molded to proper form and becomes firmly adherent to the bottom of the shoe. Then, by means of a suitable machine, such as a McKay stitching machine, the sole is united to the upper by a line of stitches 31 which pass through the edge of the vamp and the vamp lining, and which follow the edge of the sole of the last to give the desired conformation to the upper. The shoe then may be subjected to the usual operations for burnishing the sole and heel, and the usual treeing or ironing operations.

From the foregoing description, it will be seen that the shoe thus provided may be made with a minimum expense and requires very little machinery for its construction. The shoe is extremely flexible and comfortable to wear, conforming easily to the shape of the foot and bending readily when the wearer is walking. It is quite apparent that it may be provided with a welt stitched to the outsole in the usual manner. If any filling is desired, the filler may be placed on the bottom of the shoe previous to the attachment of the sole. Where a welt is employed, it may be secured to the upper by the same operation of stitching which unites the vamp and the sole lining together.

A shoe, such as herein described, may be inexpensively manufactured in large quantities without employing many of the complicated machines now used in the manufacture of the McKay or Goodyear shoes. I eliminate machines such as utilized in the usual welt-sewing operations, in forming and channeling the innersoles, in pulling over and lasting the uppers and securing them to the innersoles, and in seam-trimming and welt-beating the lasted and welted shoes. The machinery which I use is such as can be easily obtained in the open market, and comprises essentially a straight-needle sewing machine, an end-wiping machine with heaters for the end stiffeners, and a sole-laying machine for pressing the cemented soles on the bottoms of the partially completed shoes. In the shoe itself, especially when the outer sole is stitched directly to the inturned upper, I have eliminated the innersole and the welt. The sole lining in such case serves principally to secure the side edges of the vamp together until the shoe is shaped by the last and the sole is stitched thereto, and also to determine the ultimate size of the shoe. There need be no tacks or staples used in the construction of the shoe, and the disadvantages incident to their use are thereby avoided.

Having thus explained the nature of my said invention and described a way of making and using the same, although without attempting to set forth all of the forms in which it may be made or all of the modes of its use, what I claim is:

1. A shoe comprising a vamp having its edge inturned, a limp flexible sole lining, means uniting the edge of the vamp to said sole lining, an outer sole, and separate means uniting said sole to said vamp but not to said lining.

2. A shoe comprising a vamp and a vamp lining united at their lower edges and extending inwardly, a flexible textile sole lining, a line of stitches connecting the edges of the sole lining and the vamp and vamp lining, a sole, and means, separate from said line of stitches, uniting the sole to the vamp and the vamp lining.

3. A shoe comprising an upper consisting of a vamp, a vamp lining, lines of stitches uniting the upper and lower edges of said parts, a sole lining made of flexible material, and a seam connecting the edges of the sole lining to the edges of the vamp and vamp lining, in combination with an outer sole, and stitches connecting said sole to the upper.

4. A shoe consisting of an upper having its lower edge inturned to lie above the sole, a limp flexible sole lining, stitches uniting the edge of the upper to the sole lining, a sole, and a line of stitches uniting the sole to the upper and located outside the first mentioned stitches and serving to define the shape of the upper at its juncture with the sole.

5. A shoe having no innersole and comprising an upper consisting of a vamp with its lower edge inturned, a flexible textile sole lining, and a seam connecting the edges of the vamp and the sole lining, in combination with an outer sole, and means, independent of the said seam, connecting said sole and the edges of the vamp.

6. A shoe having no inner sole and comprising an upper consisting of a vamp and a vamp lining, a counter between said vamp and vamp lining having its lower marginal portions substantially meeting near the median line of the shoe, and a sole lining connected along its edges to the vamp, the vamp lining and the counter, and lying above the lower marginal portions of the counter, in combination with a sole attached to the vamp and vamp lining.

7. A shoe comprising the combination with a sole, of an upper consisting of a vamp having its lower edges inturned across the sole, a flexible limp sole lining stitched to the lower inturned edge of the vamp by a line of stitches, a counter, a toe box, and a line of fastenings independent of said stitches for securing said sole to the inturned edges of the vamp and to said counter and said toe box.

8. A shoe comprising the combination with a sole and a counter stiffener cemented to the upper face thereof; of an upper consisting of a vamp, and a flexible sole lining cemented to the upper face of the sole and stitched at its side edges to the vamp; and means securing said sole to said vamp.

9. A shoe comprising an outer sole, a vamp having its edge inturned upon the outer sole, a shaped blank having its edge permanently stitched to the inturned edge of the vamp and lying upon the sole within the space defined by said inturned edge of the vamp, and a line of fastenings passed through and uniting the said sole and the inturned edge of the vamp outside of the edge of the said blank.

10. A shoe comprising an outer sole, a vamp having a narrow edge inturned upon the outer sole, a counter stiffener having its lower edge inturned upon the sole, a shaped blank having its edge stitched to the edge of the vamp and to the counter stiffener, and a line of fastenings passing through and uniting said sole and said inturned edges of the vamp and stiffener along a line outside the edge of said blank.

11. The herein described method of making a shoe which consists in attaching the lower edge of a vamp to a shaped sole lining which determines the size of the finished shoe, then inserting a last into the partially formed shoe so that the said attached edge of the vamp is inturned over the sole of the last, placing a sole upon the bottom of said partially formed shoe, and securing the sole to the inturned edge of the vamp by a line of fastenings located outside the edge of the sole lining.

12. The herein described method of making a shoe which consists in attaching the lower edge of a vamp to a shaped sole lining which determines the size of the finished shoe, then inserting a last into the partially formed shoe so that the said attached edge of the vamp is inturned over the sole of the last, cementing a sole upon the bottom of the partially formed shoe, removing the last, and stitching the sole to the inturned edge of the vamp along a line outside the attached edge of the sole lining.

13. The herein described method of making a shoe, which consists in permanently attaching the lower edge of a vamp to a sole-shaped blank, inserting into the partially formed shoe a last having its sole area greater than the area of said blank to cause the edge of the vamp to be inturned over the sole of said last and to shape such shoe, temporarily attaching a sole upon the bottom of such shoe, removing the last, and permanently attaching said sole to the inturned edge of the vamp by a line of fasteners passing therethrough and defining the contour of the vamp at its junction with the sole.

14. The herein described method of making a shoe, which consists in stitching the edges of a shaped sole lining of flexible material to the lower edge of a vamp, inserting a last into the thus partially formed shoe, to shape the same, and stitching a sole to the vamp by stitches independent of and outside the stitches by which the lining is attached to the vamp.

15. The herein described method of making a shoe which consists in stitching together the edges of a vamp and a vamp lining, then stitching said edges to the edge of a sole lining formed of a shaped blank of limp flexible material, inserting a last into the shoe thus partially formed, and then attaching a sole.

16. The herein described method of making a shoe which consists in assembling a vamp, a vamp lining, a counter and a toe box, said counter and toe box being formed of a material adapted to be rendered plastic, securing the edges of the vamp and vamp lining and the counter and box to a shaped blank of suitable material, then inserting a last into the partially formed shoe, softening the counter and toe box, molding said counter and toe box to fit the last and permitting them to set and harden, and then attaching a sole.

17. The herein described method of making a shoe, which consists in attaching the edges of a shaped sole lining of flexible material to the lower edge of a vamp by stitches, inserting a last into the thus partially formed shoe, to shape the same, cementing and pressing a sole upon the said sole lining, and then securing said sole directly to the lower edge of the vamp by a line of fastenings located outside the stitches first mentioned.

18. The herein described method of making a shoe which consists in stitching together the edges of a vamp and a vamp lining, then stitching said edges to the edge of a sole lining formed of a shaped blank of suitable material, inserting a last into the shoe thus partially formed, cementing and pressing a sole upon said sole lining, and then securing said sole by a line of fastenings.

19. The herein described method of making a shoe which consists in assembling a vamp, a vamp lining, a counter and a toe box, said counter and toe box being formed of a material adapted to be rendered plastic, securing the edges of the vamp and vamp lining and the counter and box to a shaped blank of suitable material, then inserting a last into the partially formed shoe, softening the counter and toe box, molding said counter and toe box to fit the last and permitting them to set and harden, cementing and pressing a sole upon the sole lining, and then stitching said sole to the vamp and vamp lining.

In testimony whereof I have affixed my signature.

WILLIAM H. BAYNARD.